(12) United States Patent
Lin (10) Patent No.: US 9,551,879 B2
(45) Date of Patent: Jan. 24, 2017

(54) OPTICAL MECHANISM

(71) Applicants: Sintai Optical (Shenzhen) Co., Ltd., Shenzhen, Guandong Province (CN); Asia Optical International Ltd., Tortola (GB)

(72) Inventor: Keng-Hui Lin, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/883,712

(22) Filed: Oct. 15, 2015

(65) Prior Publication Data

US 2016/0116755 A1   Apr. 28, 2016

(30) Foreign Application Priority Data

Oct. 27, 2014   (TW) .............................. 103137038 A (51) Int. Cl.
| | |
|---|---|
| *G02B 27/28* | (2006.01) |
| *G03B 21/28* | (2006.01) |
| *G02B 27/01* | (2006.01) |
| *G03B 21/20* | (2006.01) |
| *G03B 35/20* | (2006.01) |

(52) U.S. Cl.
CPC ......... *G02B 27/283* (2013.01); *G02B 27/0101* (2013.01); *G03B 21/2073* (2013.01); *G03B 21/28* (2013.01); *G03B 35/20* (2013.01); *G02B 2027/0132* (2013.01)

(58) Field of Classification Search
CPC ..... G02B 27/18; G02B 27/149; G02B 27/283; G02B 27/1046; G02B 27/1073; H04N 9/3105; H04N 9/3167
See application file for complete search history.

(56) References Cited

U.S. PATENT DOCUMENTS

| | | | | |
|---|---|---|---|---|
| 2003/0151725 | A1* | 8/2003 | Hayashi | ............. G02B 27/1026 353/31 |
| 2006/0262275 | A1* | 11/2006 | Domroese | .............. G03B 21/14 353/20 |

FOREIGN PATENT DOCUMENTS

TW        I306517        2/2009

* cited by examiner

*Primary Examiner* — Sultan Chowdhury
(74) *Attorney, Agent, or Firm* — McClure, Qualey & Rodack, LLP (57) ABSTRACT

An optical mechanism includes a bracket, a first polarization beam splitter, a second polarization beam splitter, a plurality of panels and a plurality of lenses. The first polarization beam splitter and the second polarization beam splitter are joined to the bracket. Light passes through the first polarization beam splitter to reach the panels and is reflected by the panels to generate image beams. The image beams are reflected by the first polarization beam splitter to enter the second polarization beam splitter. The image beams are reflected by a splitting surface of the second polarization beam splitter to pass through the lenses and projected by the lenses.

12 Claims, 8 Drawing Sheets

OPTICAL MECHANISM

BACKGROUND OF THE INVENTION

Field of the Invention

The invention relates to an optical mechanism, and more particularly to an optical mechanism including a glass-made bracket joining polarization beam splitters and panels.

Description of the Related Art

Figure 1:
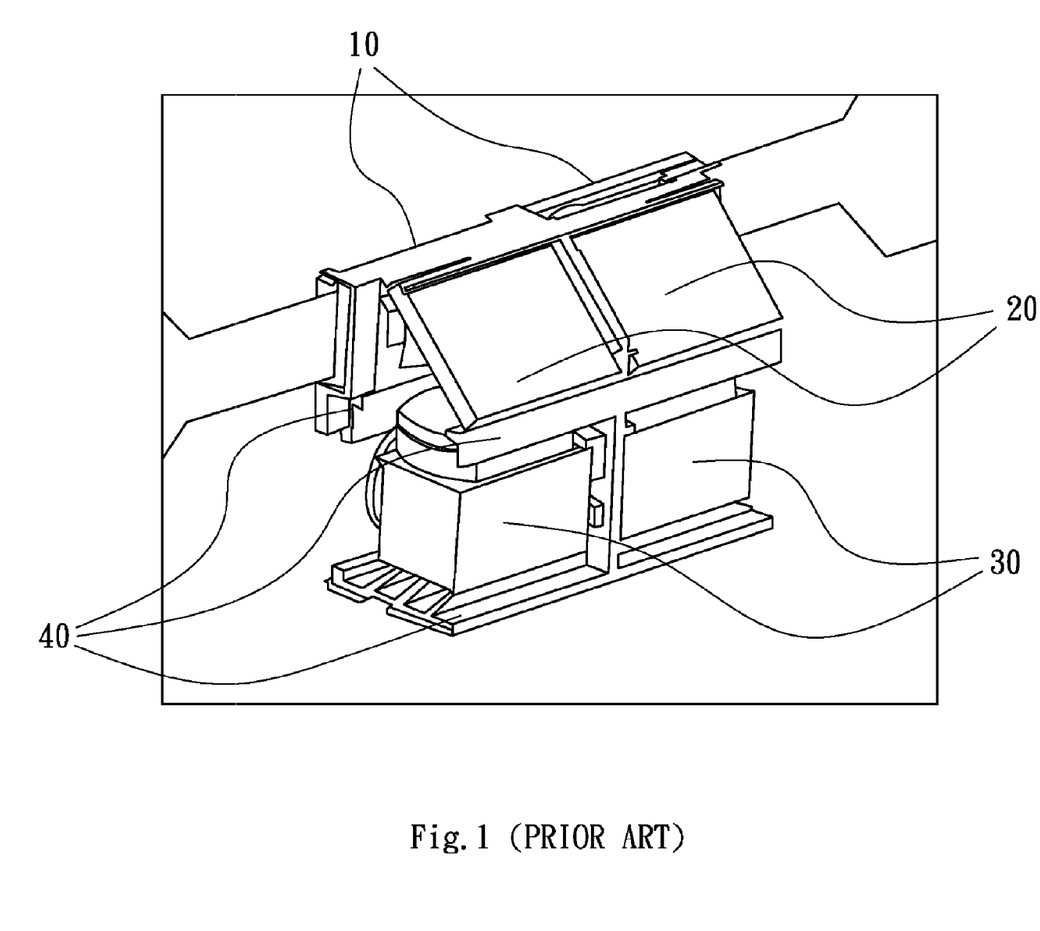
FIG. 1 is a perspective view of an optical mechanism of a conventional pico projector.
Figure 2:
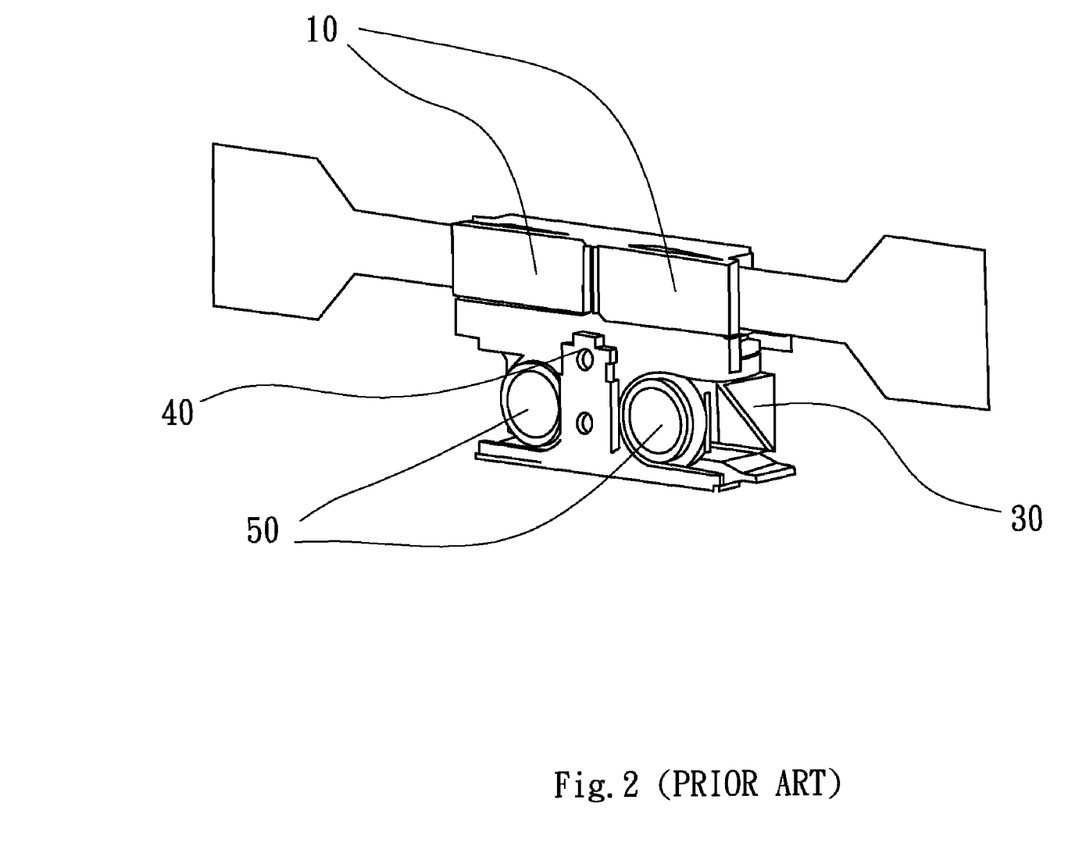
FIG. 2 is a perspective view of an optical mechanism of a conventional pico projector.

Referring to FIGS. 1 and 2, an optical mechanism for a conventional silicon based liquid crystal pico projector is shown. The optical mechanism includes two silicon-based liquid crystal panels 10, two polarization beam split plates 20, two polarization beam split cubes 30, a plastic housing 40 and two lenses 50. The silicon-based liquid crystal panels 10, the polarization beam split plates 20 and the polarization beam split cubes 30 are disposed in the plastic housing 40. The lenses 50 are disposed near the polarization beam split cubes 30. The plastic housing 10 has a thermal expansion coefficient different from those of the polarization beam split plates 20 and the polarization beam split cubes 30. In addition, accuracy of the plastic housing 40 depends on the injection molding process and assembly process. Therefore, the optical mechanism is liable to variations in dimensions and assembly, which cause poor contrast and sharpness of the projector.

Pico projectors which are applicable to the wearable devices have become the mainstream as wearable devices become popular. At present, a wearable device must be equipped with two pico projectors for a person's two eyes. Therefore, the optical axes of the two pico projector must have high related accuracy and stability. However, the conventional pico projectors as shown in FIGS. 1 and 2 are mounted individually, which may cause the following problems:

the optical axes of two pico projectors have variations caused by temperature elevation;

the optical axes of two pico projectors become non-parallel due to imprecise assembly; and images generated by the two pico projectors cannot be completely overlapped due to pixel deviation of the panels.

BRIEF SUMMARY OF THE INVENTION

An object of the invention is to provide an optical mechanism for a pico projector. The pico projector includes a glass-made bracket for joining a plurality of panels, a polarization beam split plate and a polarization beam split block. The polarization beam split plate and the polarization beam split block extend lengthwise so that the panels can be arranged to correspond to one polarization beam split plate and one polarization beam split block to reduce variations in image formation of each panel.

The optical mechanism in accordance with an exemplary embodiment of the invention includes a bracket having a first side and a second side; a first polarization beam splitter connected to the first side; a second polarization beam splitter connected to the second side and including a first splitting surface and a light exiting surface; a plurality of panels disposed near the first polarization beam splitter; and a plurality of lenses disposed near the second polarization beam splitter and arranged corresponding to the panels, wherein light passing through the first polarization beam splitter is reflected by the panels to generate a first image beam and a second image beam; the first image beam and the second image beam are reflected by the first polarization beam splitter, enter the second polarization beam splitter, leave the second polarization beam splitter through the light exiting surface, and are projected through the lenses to form an image; the second image beam is reflected by the first light splitting surface to the light exiting surface after entering the second polarization beam splitter; and the second image beam is projected through one of the lenses.

In another exemplary embodiment, the first side and the second side are opposite.

In yet another exemplary embodiment, the first polarization beam splitter includes a polarization beam split plate.

In another exemplary embodiment, the second polarization beam splitter includes a polarization beam split block.

In yet another exemplary embodiment, the panel is a liquid crystal on silicon panel.

In another exemplary embodiment, the bracket is made of glass.

In yet another exemplary embodiment, the bracket is made of Borofloat glass.

The optical mechanism in accordance with another exemplary embodiment of the invention includes at least one first polarization beam splitter; only one second polarization beam splitter having a light exiting surface; a plurality of panels; and at least one lens corresponding to the panels and the light exiting surface, wherein light passing through the first polarization beam splitter is reflected by the panels to generate a plurality of image beams, the image beams are reflected by the first polarization beam splitter, enter the second polarization beam splitter and leave the second polarization beam splitter through the light exiting surface, and the image beams are projected through the lens to form an image.

In another exemplary embodiment, the optical mechanism includes a plurality of lenses, and the image beams are projected through the lenses to form an image.

In yet another exemplary embodiment, the lenses are arranged horizontally with respect to the second polarization beam splitter.

In another exemplary embodiment, the lenses are arranged vertically with respect to the second polarization beam splitter.

In yet another exemplary embodiment, the second polarization beam splitter extends lengthwise.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
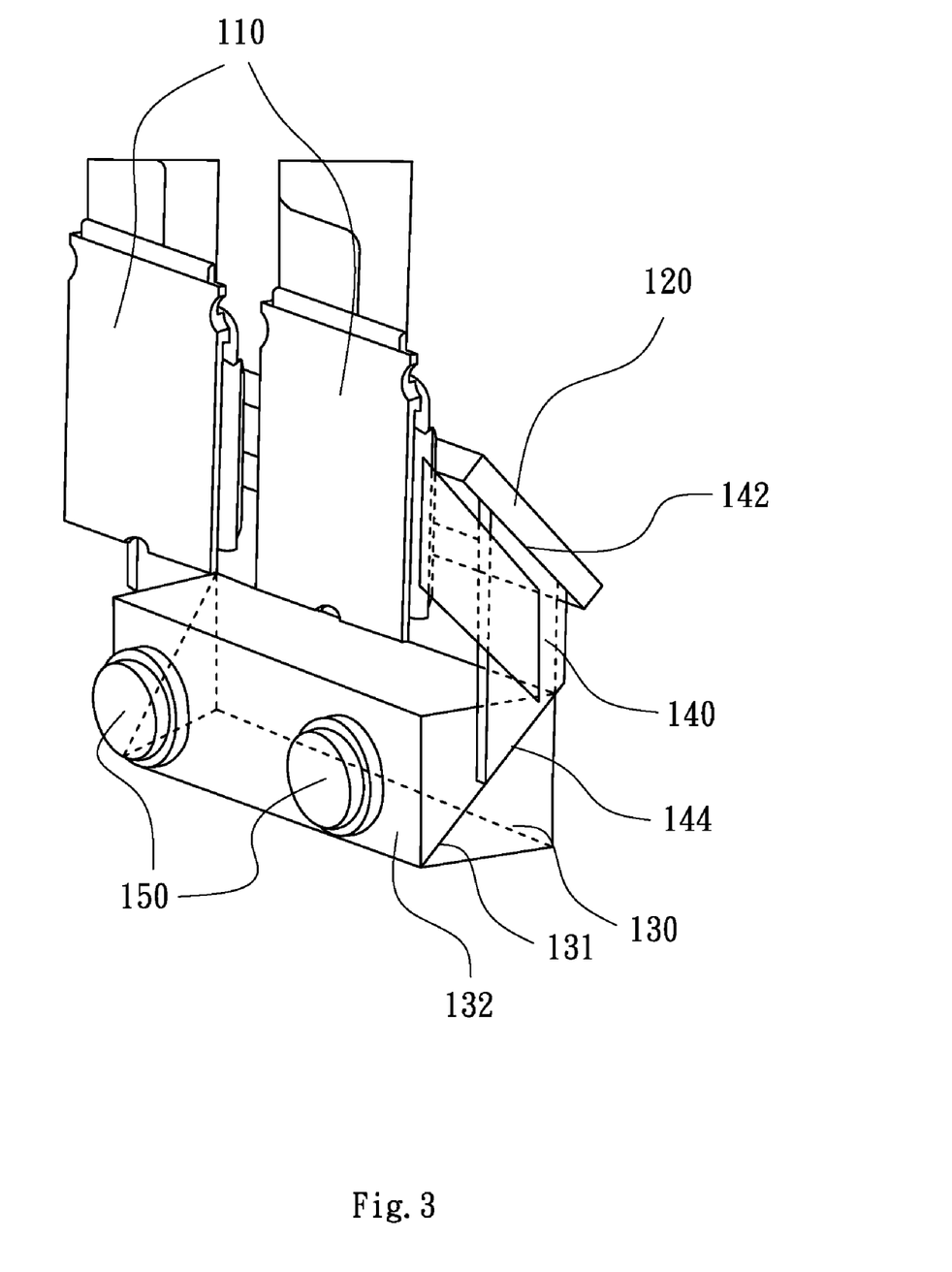
FIG. 3 is a perspective view of an embodiment of an optical mechanism of a pico projector of the invention.
Figure 4:
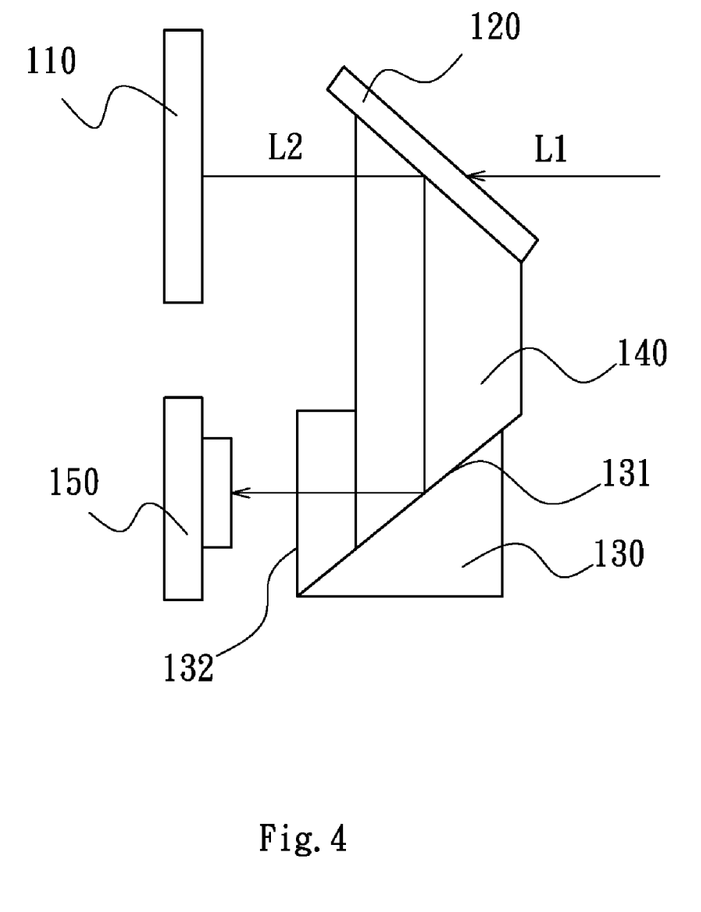
FIG. 4 depict an optical path of the embodiment of the optical mechanism of FIG. 3.

Referring to FIGS. 3 and 4, an optical mechanism of a pico projector of the invention includes two panels 110, a first polarization beam slitter 120, a second polarization beam slitter 130, two brackets 140 and two lenses 150. Each bracket 140 has a first side 142 and a second side 144. The first polarization beam splitter 120 is joined to the first side 142 of the bracket 140, and the second polarization beam splitter 130 is joined to the second side 144 of the bracket 140. The panels 110 are disposed near the first polarization beam splitter 120, and the lenses 150 are disposed near the second polarization beam slitter 130. The second polarization beam slitter 130 has a first slitting surface 131 and a light exiting surface 132. The lenses 150 correspond to the light exiting surface 132.

A light beam L1 from a light source (not shown) passes through the first polarization beam splitter 120 to reach the panels 110 and is reflected by the panels 110 to form two image beams L2. The image beams L2 are reflected by the first polarization beam splitter 120 to enter the second polarization beam slitter 130 and reflected by the first splitting surface 131 to leave the second polarization beam slitter 130 through the light exiting surface 132. The image beams L2 are projected through the lenses 150 to generate two images for the right eye and the left eye of an audience.

In this embodiment, the bracket 140 is made of glass, such as Borofloat glass which has a thermal expansion coefficient of $4\times10^{-6}$ m/m° C., the first polarization beam splitter 120 is a polarization beam split plate (PBS plate), the second polarization beam splitter 130 is a polarization beam split block (PBS block), and the panels 110 are liquid crystal on silicon panel (LCoS Panel).

The bracket 140 is made of glass which has a thermal expansion coefficient close to the thermal expansion coefficient of the first polarization beam splitter 120 and the second polarization beam splitter 130. Therefore, deformation of structure due to difference of thermal expansion coefficient can be avoided. As the glass can be grounded, the bracket 140 made of glass has a higher accuracy in measurements than conventional brackets manufactured by plastic injection molding. In addition, the first polarization beam splitter 120 and the second polarization beam splitter 130 can be directly joined to the glass bracket 140, without the assembly error of the conventional polarization beam split plates 20, the polarization beam split cubes 30, and the plastic housing 40. In the invention, therefore, an assembly error of the first polarization beam splitter 120, the second polarization beam splitter 130 and the bracket 140 can be effectively avoided.

The accuracy of assembling the first polarization beam splitter 120 and the second polarization beam splitter 130 is very important, to avoid the inclination of image surface and reduction in MTF. The polarization beam splitters of the conventional pico projector shown in FIGS. 1 and 2 are manufactured and mounted individually so that accurately mounting the polarization beam splitters is difficult. As a result, the optical axes of the polarization beam splitters may be not parallel to each other. In the invention, however, the optical mechanism utilizes only one first polarization beam splitter 120 and only one second polarization beam splitter 130, and all optical elements commonly correspond to the first polarization beam splitter 120 and the second polarization beam splitter 130. Therefore, the non-parallel optical axes problem caused by inaccuracy of assembly does not occur.

Figure 5A:
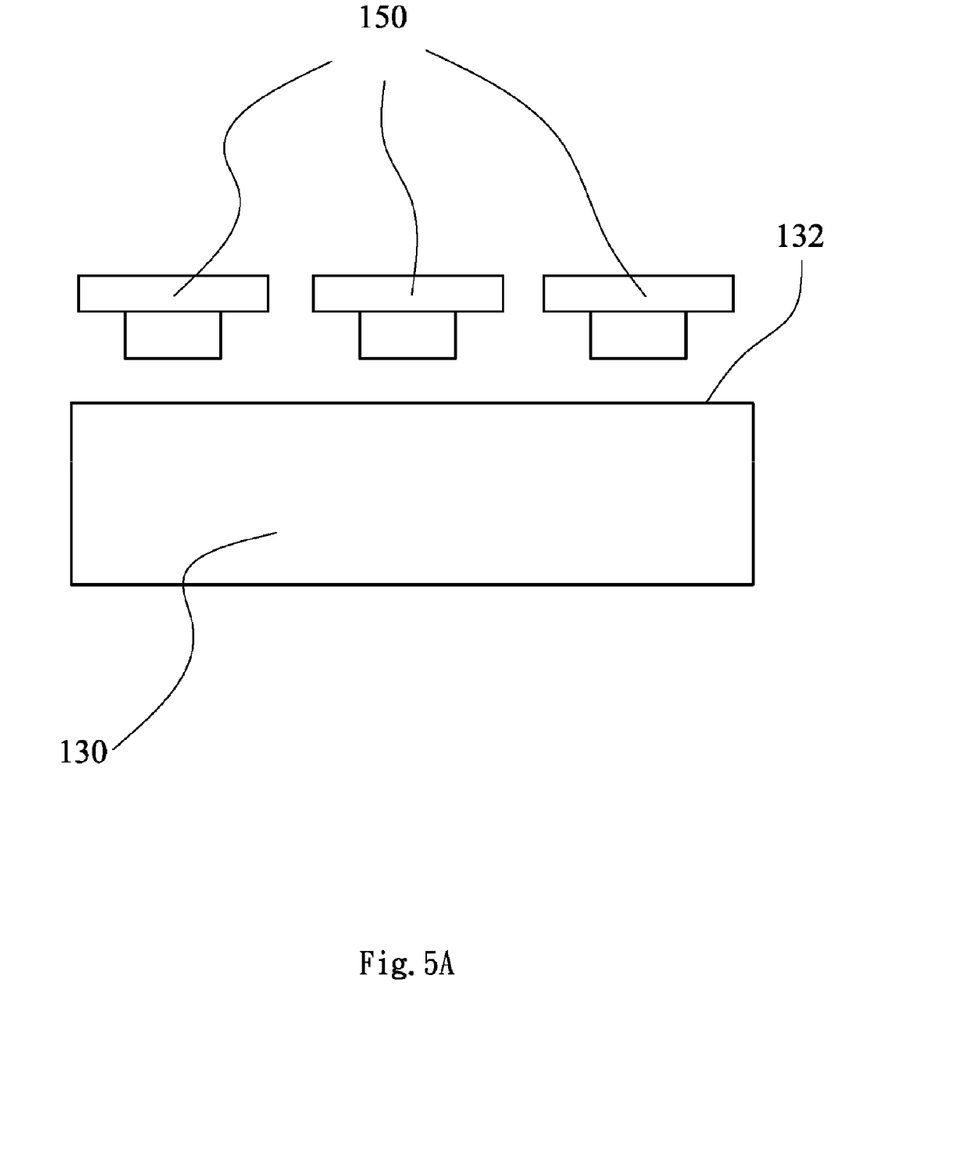
FIGS. 5A-5D depict several arrangements of lenses and a second polarization beam splitter of an optical mechanism of the invention.
Figure 5B:
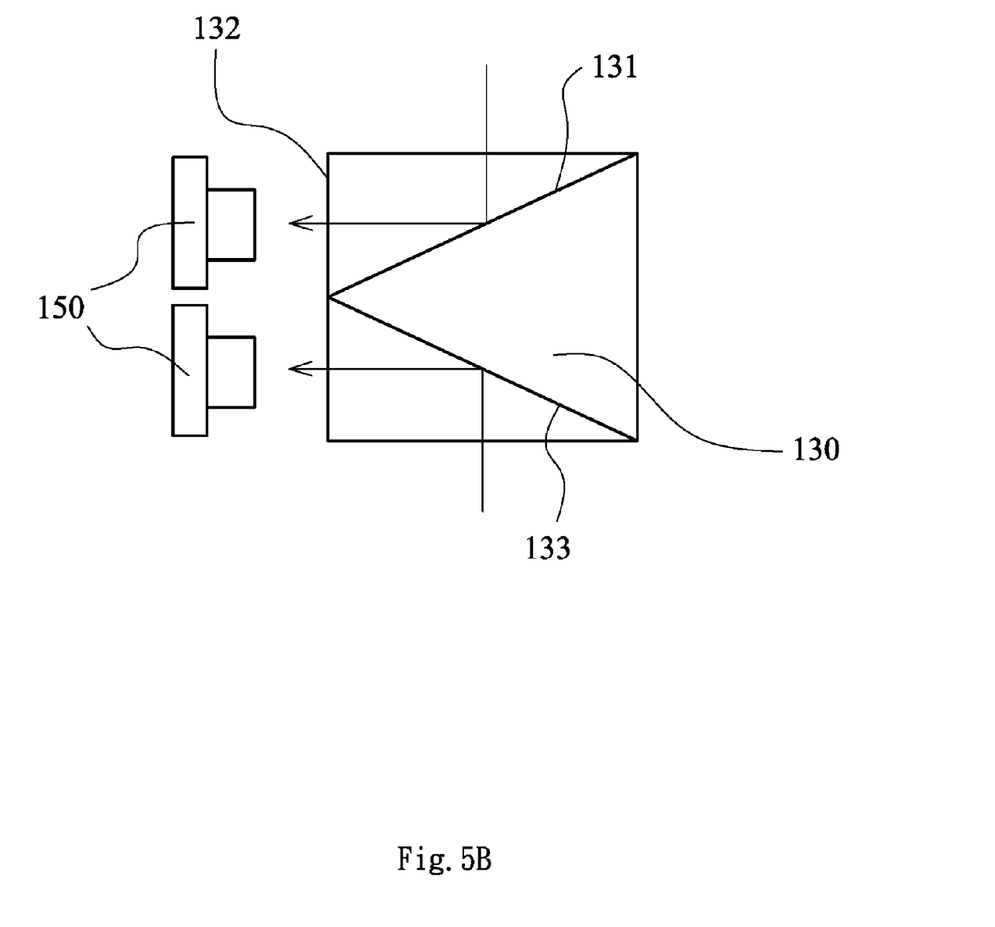
Figure 5C:
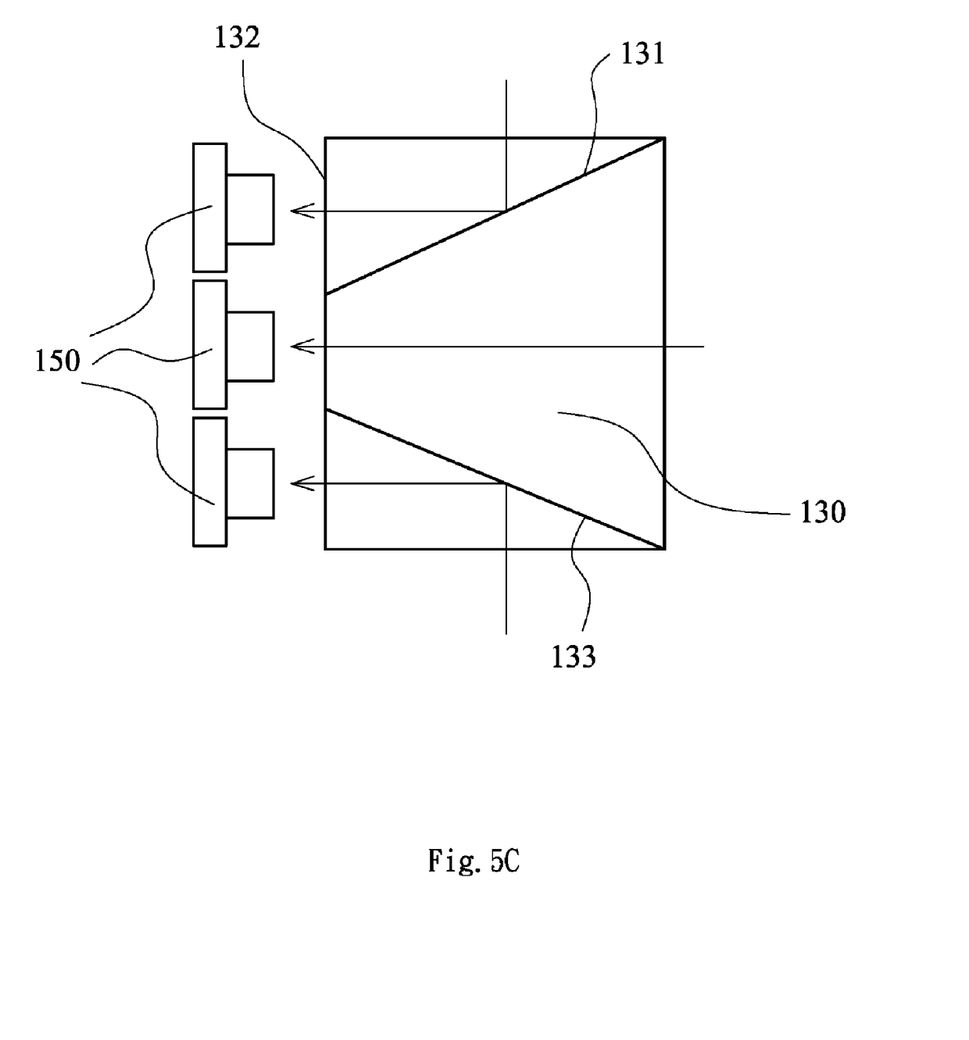
Figure 5D:
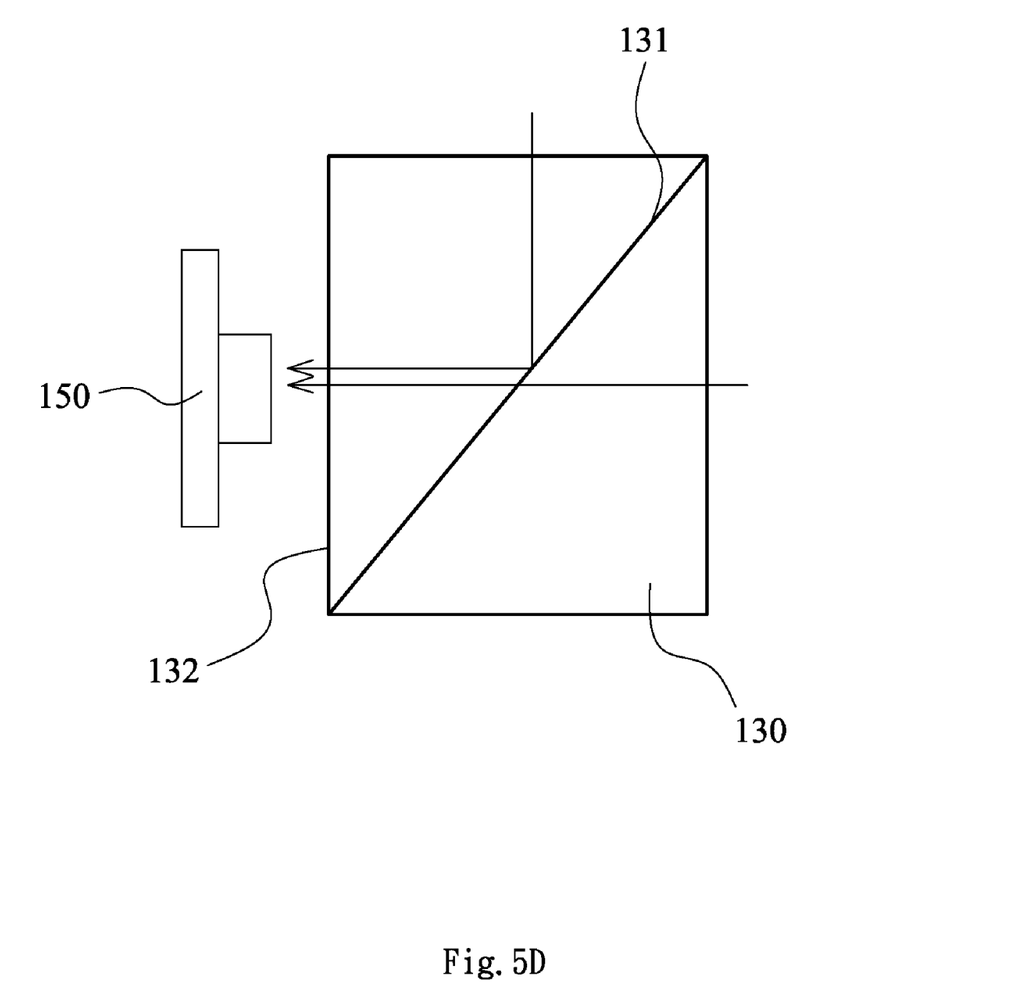

As shown in FIG. 3, the second polarization beam splitter 130 is a block extending lengthwise. FIG. 5A is a top view of the second polarization beam splitter 130, wherein three lenses 150 are arranged horizontally with respect to the second polarization beam splitter 130 (or arranged in a longitudinal direction of the second polarization beam splitter 130). In operation, the image beams from the three panels 110 are reflected by the second polarization beam splitter 130 and projected through the three lenses 150. FIG. 5B is a side view of the second polarization beam splitter 130 according to another embodiment, wherein two lenses 150 are arranged vertically with respect to the second polarization beam splitter 130, and two panels (not shown) are respectively disposed above and below the second polarization beam splitter 130. The image beams from the panels are reflected by the first splitting surface 131 and the second splitting surface 132 and projected through two lenses 150 which are vertically disposed to form two images. FIG. 5C is a side view of the second polarization beam splitter 130 according to yet another embodiment, wherein three lenses 150 are arranged vertically and three panels (not shown) are respectively disposed above, beside, and below the second polarization beam splitter 130. In operation, two of the image beams (second image beam) from the upper and lower panels are reflected by the first splitting surface 131 and the second splitting surface 132 to the upper and lower lenses 150, while the other image beam (first image beam) travels without any reflection to enter the middle lens. As a result, three images are generated. In FIG. 5D, a single lens 150 and two panels (not shown) are provided in another embodiment, wherein the panels are respectively disposed above and beside the second polarization beam splitter 130. An image beam (second image beam) from by the upper panel is reflected by the first splitting surface 131 and projected through the lens 150, and another image beam (first image beam) travels without any reflection from the polarization beam splitter 130 to the lens 150 and projected through the lens 150.

In the invention, since multiple optical elements correspond to one polarization beam splitter, no regulation or alignment is needed for the optical mechanism, and the optical elements can be arranged horizontally and vertically.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical mechanism, comprising:
a bracket having a first side and a second side;
a first polarization beam splitter connected to the first side;
a second polarization beam splitter connected to the second side and comprising a first splitting surface and a light exiting surface;
a plurality of panels disposed near the first polarization beam splitter; and
a plurality of lenses disposed near the second polarization beam splitter and arranged corresponding to the panels, wherein light passing through the first polarization beam splitter is reflected by the panels to generate a first image beam and a second image beam; the first image beam and the second image beam are reflected by the first polarization beam splitter, enter the second polarization beam splitter, leave the second polarization beam splitter through the light exiting surface, and are projected through the lenses to form an image; the second image beam is reflected by the first light splitting surface to the light exiting surface after entering the second polarization beam splitter; and the second image beam is projected through one of the lenses.

2. The optical mechanism as claimed in claim 1, wherein the first side and the second side are opposite.

3. The optical mechanism as claimed in claim 1, wherein the first polarization beam splitter comprises a polarization beam split plate.

4. The optical mechanism as claimed in claim 1, wherein the second polarization beam splitter comprises a polarization beam split block.

5. The optical mechanism as claimed in claim 1, wherein the panel is a liquid crystal on silicon panel.

6. The optical mechanism as claimed in claim 5, wherein the bracket is made of glass.

7. The optical mechanism as claimed in claim 6, wherein the bracket is made of Borofloat glass.

8. An optical mechanism, comprising:
at least one first polarization beam splitter;
only one second polarization beam splitter having a light exiting surface;
a plurality of panels; and
at least one lens corresponding to the panels and the light exiting surface, wherein light passing through the first polarization beam splitter is reflected by the panels to generate a plurality of image beams, the image beams are reflected by the first polarization beam splitter, enter the second polarization beam splitter and leave the second polarization beam splitter through the light exiting surface, and the image beams are projected through the lens to form an image.

9. The optical mechanism as claimed in claim 8, wherein the optical mechanism comprises a plurality of lenses, and the image beams are projected through the lenses to form an image.

10. The optical mechanism as claimed in claim 9, wherein the lenses are arranged horizontally with respect to the second polarization beam splitter.

11. The optical mechanism as claimed in claim 9, wherein the lenses are arranged vertically with respect to the second polarization beam splitter.

12. The optical mechanism as claimed in claim 10, wherein the second polarization beam splitter extends lengthwise.

* * * * *